United States Patent [19]

Noll et al.

[11] 3,935,146

[45] Jan. 27, 1976

[54] POLYURETHANEAMIDES DISPERSIBLE IN WATER AND DISPERSIONS CONTAINING THEM

[75] Inventors: Klaus Noll; Walter Schröer; Josef Pedain; Helmut Reiff, all of Cologne, Germany

[73] Assignee: Bayer Aktiengesellschaft, Leverkusen Bayerwerk, Germany

[22] Filed: Mar. 18, 1974

[21] Appl. No.: 452,153

[30] Foreign Application Priority Data
Apr. 25, 1973 Germany............................ 2320719

[52] U.S. Cl. ...... 260/29.2 TN; 260/29.4 R; 260/70; 260/75 NQ; 260/77.5 AQ; 428/425; 428/473; 428/904
[51] Int. Cl.² .......................................... C08G 18/12
[58] Field of Search. ............... 260/29.2 TN, 75 NQ, 77.5 AQ

[56] References Cited
UNITED STATES PATENTS

| | | | |
|---|---|---|---|
| 2,835,653 | 5/1958 | Haas et al. ................... | 260/29.2 TN |
| 3,479,310 | 11/1969 | Dieterich et al. ............ | 260/29.2 TN |
| 3,666,542 | 5/1972 | Kigane et al. ............... | 260/29.2 TN |
| 3,730,927 | 5/1973 | Schloss ........................ | 260/29.2 TN |
| 3,769,318 | 10/1973 | Windemuth et al. .......... | 260/2.5 AT |
| 3,796,678 | 3/1974 | Bartizal ....................... | 260/29.2 TN |

FOREIGN PATENTS OR APPLICATIONS

| | | | |
|---|---|---|---|
| 919,329 | 1/1973 | Canada ....................... | 260/29.2 TN |
| 2,141,805 | 2/1972 | Germany | |
| 2,141,807 | 2/1972 | Germany | |

*Primary Examiner*—Murray Tillman
*Assistant Examiner*—A. H. Koeckert
*Attorney, Agent, or Firm*—Joseph C. Gil; Gene Harsh

[57] ABSTRACT

A polyurethaneamide containing ethylene oxide units and adapted to be dispersed in water without added emulsifiers and dispersions containing them are provided. The novel dispersions produce coatings on leather and other substrates having an improved glossy appearance.

15 Claims, No Drawings

POLYURETHANEAMIDES DISPERSIBLE IN WATER AND DISPERSIONS CONTAINING THEM

This invention relates generally to polyurethanes and more particularly to improve aqueous dispersions of polyurethanes and to a method of making them.

Dispersions of polyurethanes and polyureas and methods for making them have been disclosed heretofore. In accordance with the disclosure in U.S. Pat. No. 3,294,724, polyurethanes can be dispersed in water to form latices by the action of high shearing forces in the presence of external emulsifiers but these dispersions have two serious disadvantages. The dispersions are not completely stable in storage and films produced therefrom have poor resistance to water.

These two disadvantages can be avoided by modifying the polyurethane elastomers with ionic groups. Dispersions prepared from such modified polyurethanes are stable for unlimited periods of time even when exposed to the action of shearing forces. Moreover, films or similar structures prepared from the latices have all the advantageous properties of the linear polyurethane elastomers including their high elasticity, high tensile strength and high resistance to hydrolysis and, if the polyurethanes are prepared from suitable starting components, they also have high light fastness.

Furthermore, polyurethane dispersions have recently become known which are rendered dispersible not by ionic groups but by centers which make use of the hydrophilic characteristic of polyethylene oxide ethers (German Offenlegungsschrift Nos. 2,141,805 and 2,141,807).

These dispersions are prepared by reacting a trifunctional isocyanate prepolymer obtained from a trifunctional polypropylene oxide polyether and the stoichiometrically required quantity of a diisocyanate with monofunctional alcohol mixtures which contain polyethylene oxide ether, using 1 mol of isocyanate prepolymer to 1 mol of the mixture of monofunctional alcohols. The resulting mixture which contains isocyanate groups is dispersed in water under the action of shearing forces and undergoes an increase in molecular weight due to the known reactions of isocyanate groups with difunctional compounds (e.g. diamines).

According to the examples given in German Offenlegungsschrift No. 2,141,805 and Example 4 of German Offenlegunsschrift No. 2,141,807, films and similar structures obtained from these dispersions have elastic moduli of about 5 kg wt/cm², tensile strengths of about 10 kg wt/cm² and elongations at break of about 200%. Such dispersions are unsuitable for the production of self-supporting elastic films or for coating on flexible substrates if good physical properties are required of the coating. The properties of these dispersions make them much more suitable for use as adhesives.

The polyurethane dispersions which can be obtained in accordance with an earlier proposal of the present applicants U.S. application Ser. Nos. 452,163 and 452,180, both filed on Mar. 18, 1974) differ favorably from the above mentioned dispersions of the known art by the fact that, when dried on substrates they form films which are substantially superior in tensile strength and elasticity. The polyurethane dispersions obtained in accordance with these earlier proposals are therefore suitable in principle for coating sheetings such as leather, artificial leather or paper but, when used in these fields, and particularly as dressings for leather, they still have the disadvantage that coatings prepared therefrom on small surfaces sometimes do not have the high gloss which is often required of leather dressings. Furthermore, these dispersions are generally too soft for application as dressings to insure sufficient abrasion resistance. Although they can be adjusted to form hard finishes, these are too brittle and insufficiently elastic and, moreover, tend to crack when bent sharply at low temperatures.

It is therefore an object of this invention to provide new aqueous polymer dispersions which are devoid of the disadvantages described above when used as coatings for flexible substrates and, in particular, as leather dressings. Another object of the invention is to provide aqueous polymer dispersions which can be used to make films or sheets having mechanical properties at least equal to those of known coatings or leather dressings based on solutions in organic solvents of polyurethanes or of reaction mixtures which react to form polyurethanes while avoiding the disadvantages inherent in the known systems, particularly their pollution of the environment, danger to health and flammability. A further object of the invention is to provide a polyaddition reaction product of an organic diisocyanate and organic compounds having reactive hydrogen atoms determinable by the Zerewitinoff method which is dispersible in water without an added emulsifier and when applied to a substrate such as leather and dried produces a coating in the substrate having a glossy finish.

The objects of the invention are accomplished in accordance with this invention, generally speaking, by providing novel polyurethane amide dispersions which are eminently suitable, in particular, for use as the final dressing applied to a substrate such as leather from an aqueous phase. The polyurethane amide dispersions provided by the invention make it possible to use trouble-free methods of treatment of the substrate which are harmless to the environment and offer the possibility of adjusting or predetermining the handle, gloss, hardness and flexibility of the product to adapt it for a particular utility without the properties of the leather or other substrate being adversely affected. Furthermore, the dispersions according to the invention can be cross-linked to form insoluble films with formaldehyde or formaldehyde derivatives with the aid of acid catalysts since they are completely insensitive to electrolytes. They are also insensitive to frost so that no difficult precautions are required for transporting them from place to place.

This invention therefore relates to a process for the preparation of emulsifier-free, non-ionic, aqueous polyurethane amide dispersions wherein an organic diisocyanate is reacted with an organic compound having a molecular weight of 300 to 6000 which are difunctional for the purpose of the isocyanate polyaddition reaction, contain terminal hydrogen atoms which are determinable by the Zerewitinoff method and are reactive with isocyanate groups and do not contain any side chain polyethylene oxide units, to which reaction mixture chain lengthening agents with a molecular weight below 300 which are known per se in the chemistry of polyurethanes and the usual auxiliary agents and additives used in polyurethane chemistry may be added, and with the further addition of i. organic compounds which are difunctional for the purpose of the isocyanate polyaddition reaction and which contain hydrogen atoms which are reactive with isocyanate groups as well as side chain polyethylene oxide units and/or ii. organic diisocyanates or diisocyanate mixtures which contain about 5 mol percent to 100 mol percent of diisocyanates which have side chain polyethylene oxide units.

In accordance with the invention from about 5% to 100% by weight of the organic compound having a molecular weight of 300 to 6000 which contain hydrogen atoms reactive with isocyanate groups must be polyamides or polyester amides, the proportion of ester groups to amide groups in the case of polyester amides being not more than 15 : 1 and the proportions of the reactants being so chosen that the dispersed polyurethane contains about 0.5% to about 20% by weight of amide groups (—NH—CO—).

The invention also provides polyurethane amide dispersions prepared by this process.

The preparation of the polyurethane amides may be carried out either a. under substantially anhydrous conditions, the finished polyurethane amide being then converted into an aqueous dispersion in known manner, or
b. in two stages by the prepolymer process, the second stage involving chain lengthening of the prepolymers in the presence of water.

Furthermore, this invention provides thermoplastic polyurethane elastomers which are dispersible in water and have a substantially linear molecular structure, characterized by a. containing about 3 percent to about 30 percent by weight of polyethylene oxide side chains in side positions
b. containing about 0.5 to about 20 percent by weight of amide groups —NH—CO— in the linear main chain.

Moreover, the invention provides a process for coating leather, artificial leather and paper with the polyurethane amide dispersions obtainable according to the invention.

Any suitable organic diisocyanate having the general formula $R(NCO)_2$ in which R represents an organic group such as may be obtained by removing the isocyanate groups from an organic diisocyanate with a molecular weight in the range of about 112 to about 1000, preferably about 140 to about 400 may be used in practicing the invention. Diisocyanates which are particularly preferred for the process according to the invention are those conforming to the formula $R(NCO)_2$ in which R represents a divalent aliphatic hydrocarbon radical containing 4 to 18 carbon atoms, a divalent cycloaliphatic hydrocarbon group containing 5 to 15 carbon atoms, a divalent aromatic hydrocarbon radical containing 6 to 15 carbon atoms or an araliphatic hydrocarbon radical containing 7 to 15 carbon atoms. The following are typical examples of those organic diisocyanates which are particularly preferred for the process according to the invention: tetramethylene diisocyanate, hexamethylene diisocyanate, dodecamethylene diisocyanate, cyclohexane-1,3-diisocyanate, cyclohexane 1,4-diisocyanate, 1-isocyanato-3-isocyanato-methyl-3,5,5-trimethylcyclohexane, 4,4'-diisocyanatodicyclohexylmethane as well as aromatic diisocyanates such as 2,4-idisocyanatotolylene, 2,6-diisocyanatotolyene and mixtures of these isomers, 4,4'-diisocyanatodiphenylmethane, 1,5-diisocyanatonaphthalene, and the like.

Any suitable organic compound having hydrogen atoms determinable by the Zerewitinoff method and a molecular weight within a range of 300 to 6000, preferably about 600 to about 3000, are difunctional for the purpose of the isocyanate polyaddition reaction and contain groups which are reactive with isocyanates may be used. For example, any suitable dihydroxypolyester known in polyurethane chemistry which is obtained from a dicarboxylic acid, such as succinic acid, adipic acid, suberic acid, azelaic acid, sebacic acid, phthalic acid, isophthalic acid, terephthalic acid, tetrahydrophthalic acid, and the like and diols such as ethylene glycol, propylene-1,2-glycol, propylene-1,3-glycol, diethylene glycol, butane-1,4-diol, hexane-1,6-diol, octane-1,8-diol, neopentyl glycol, 2-methylpropane-1,3-diol or the various isomeric bis-hydroxymethyl cyclohexanes and the like may be used. Also, any suitable polylactone known in polyurethane chemistry, e.g. the polymers of ε-caprolactone which are initiated on one of the above mentioned divalent alcohols may be used.

Any suitable polycarbonate known in polyurethane chemistry which can be obtained, for example, by reacting one of the above mentioned diols with diarylcarbonates or phosgene may be used.

Any suitable polyether known in polyurethane chemistry, for example the polymers or copolymers of styrene oxide, propylene oxide, tetrahydrofuran, butylene oxide or epichlorohydrin which can be prepared from divalent starter molecules such as water, the above mentioned diols or amines which contain two N—H groups may be used. Ethylene oxide may also be included, provided that the polyether used does not contain more than about 10% by weight of ethylene oxide, but the polyethers used are generally those which have been prepared without ethylene oxide.

Any suitable polythioether, polythio mixed ether and polythio ether ester known in polyurethane chemistry may be used.

Any suitable polyacetal known in polyurethane chemistry, for example, those obtained from the above mentioned diols and formaldehyde may be used. Also, any suitable difunctional polyether ester which contains terminal groups which are reactive with isocyanate groups may be used.

The preferred organic compounds having reactive hydrogens of this type are dihydroxypolyesters, dihydroxypolylactones, dihydroxypolycarbonates and dihydroxypolyethers.

Any suitable conventional chain lengthening agent with a molecular weight below 300 may be used in the process according to the invention for preparing self dispersible polyurethane amides. The low molecular weight diols which have been described for the preparation of dihydroxypolyeters, diamines such as diaminoethane, 1,6-diaminohexane, piperazine, 2,5-dimethylpiperazine, 1-amino-3-aminomethyl-3,3,5-trimethylcyclohexane, 4,4'-diaminodicyclohexylmethane, 1,4-diaminocyclohexane and 1,2-propylenediamine, hydrazine, aminoacid hydrazides, hydrazides of semicarbazidocarboxylic acids, bis-hydrazides and bis-semicarbazides are examples thereof.

Compounds which are difunctional for the purpose of the isocyanate polyaddition reaction and contain terminal hydrogen atoms which are reactive with isocyanate groups and side chain polyethylene oxide chains and/or diisocyanates which contain side chain polyethylene oxide units may also be used as chain extenders in the process of the invention.

Suitable difunctional organic compounds which contain hydrogen atoms that are reactive with isocyanate groups and have side chain polyethylene oxide units are in particular those of the general formula:

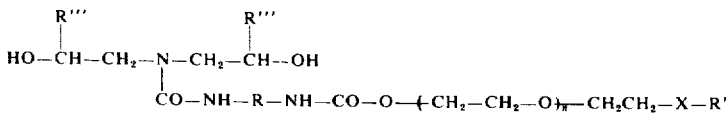

in which
R represents a divalent group which is obtained by the removal of the isocyanate groups from a diisocyanate with a molecular weight of from about 112 to about 1000,
X represents oxygen or $-NR''-$,
R' and R'', which may be the same or different, represent monovalent hydrocarbon groups containing from 1 to 12 carbon atoms,
R''' represents hydrogen or a monovalent hydrocarbon group containing from 1 to 8 carbon atoms and
n is an integer of from 4 to 89.

These compounds may be obtained, for example, by the following methods:

Monovalent alcohols which contain polyethylene oxide units according to the following formula
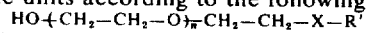
are first prepared by ethoxylating monohydric alcohols or monohydric phenols of the general formula $R'-X-H$ ($X = O$) or by ethoxylating secondary amines of the general formula $R'-X-H$ ($X = NR''$), in which formula R' and R'' which may be the same or different represent hydrocarbon groups, in particular $C_1$ to $C_{10}$ alkyl groups, $C_4$ to $C_8$ cycloalkyl groups, $C_6$ to $C_{12}$ aryl groups or $C_7$ to $C_{10}$ aralkyl groups.

The following are examples of suitable alcohols or phenols: methanol, ethanol, n-propanol, n-hexanol, n-decanol, isopropanol, tertiary butanol, phenol, p-cresol and benzyl alcohol. The following are examples of suitable secondary amines: dimethylamine, diethylamine, dipropylamine, N-methylhexylamine, N-ethylamine, N-methyl-aniline, N-ethylbenzylamine and N-methyl-cyclohexylamine.

The quantity of ethylene oxide incorporated in the polyurethane amide may vary within wide limits, the polyethylene oxide chain generally comprising from about 5 to about 90, preferably about 20 to about 70, ethylene oxide units.

Reaction of the resulting monovalent alcohol which contains polyethylene oxide units with a large excess of one of the diisocyanates of the general formula $(R(NCO)_2$ mentioned by way of example above, followed by removal of the excess diisocyanate to obtain the corresponding monoisocyanate which contains polyethylene oxide units in accordance with the general formula:

NCO—R—NH—CO—O—(CH₂—CH₂—O)ₙ—CH₂—CH₂—X—R' is then carried out in a second reaction step.

In this second reaction step, the diisocyanate is preferably used in an about 2 to about 10 times molar excess to prevent the formation of corresponding bisurethanes which are free from isocyanato groups. This second reaction step is preferably carried out by adding the monovalent alcohol which contains polyethylene oxide units to the diisocyanate. It is carried out at a temperature of from about 70° to about 130°C. Subsequent removal of the diisocyanate excess is preferably carried out by thin layer vacuum distillation at 100° to 180°C.

The hydrophilic chain lengthening agent is then obtained in a third reaction step by reacting the above described monoisocyanates which contain polyethylene oxide units with dialkanolamines of the general formula

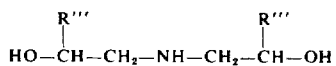

in which R''' has the meaning already specified. In this third reaction step, the reactants are preferably used in stoichiometric proportions. This third reaction step is preferably carried out at a temperature of from 0° to 50°C, in particular at 15° to 30°C.

Suitable dialkanolamines of the above mentioned general formula are, for example, diethanolamine, dipropanolamine (R''' = CH₃) and bis-(2-hydroxy-2-phenyl-ethyl)-amine.

Suitable diisocyanates with side chain polyethylene oxide units for the process according to the invention are in particular those of the general formula

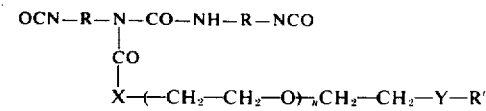

in which R, R' and X have the meanings specified above, Y represents a group which may be the same as or different from X and having one of the meanings specified for X and n is an integer of from 9 to 89.

The preparation of such modified allophanate diisocyanates may be carried out, for example, by heating one mol of a monofunctional alcohol of the general formula
with two mols of one of the above mentioned diisocyantes of the general formula $R(NCO)_2$, the urethane being first formed which then reacts with a second mol of diisocyanate at a higher temperature to form the allophanate diisocyanate. R', Y and n have the same meanings in this formula as above. If desired, trimerization of the diisocyanate may be prevented by the method indicated in U.S. Pat. No. 3,769,318 the disclosure of which is incorporated herein by reference, by adding catalytic quantities of alkylating agents such as p-toluene sulphonic acid esters. Allophanatization may be accelerated if desired by the method according to U.S. Pat. No. 3,769,318, the disclosure of which is incorporated herein by reference of adding certain metal compounds such as zinc acetyl acetonate. Preparation of the allophanate diisocyanates used according to the invention may, for example, be carried out as follows: 1500 g of a polyethylene oxide alcohol which has been initiated on n-butanol and has a molecular weight of 2030 are heated with 1305 g of tolylene diisocyanate in the presence of 0.1% of methyl p-toluenesulphonate and 0.005% of zinc acetyl acetonate at 100°C for 5 hours. 2805 g of the solution of the allophanate diisocyanate used according to the invention in tolylene diisocyanate is obtained after the addition of 0.025% of benzoyl chloride. The isocyanate value of the allophanate diisocyanate is 20.6%; the polyethylene oxide content is approximately 53%.

Part of the material is freed from excess tolylene diisocyanate in a thin layer evaporator. The pure allophanate diisocyanate which has an isocyanate value of 3.6% is thus obtained.

When allophanate diisocyanates are used in the process according to the invention, it is preferred to use diisocyanate mixtures which comprise the allophanate diisocyanate used according to the invention and unmodified diisocyanates of the above formula $R(NCO)_2$, these diisocyanate mixtures containing about 5 mol percent to about 100 mol percent and preferably about 10 mol percent to about 50 mol percent of the modified diisocyanates according to the invention.

To prepare the biuret diisocyanates which may be used according to the invention instead of allophanate diisocyanates, a monovalent alcohol of the formula

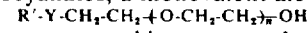

is first converted into a secondary amine of the general formula

R', Y and n in these formulae having the same meanings as above. This conversion of alcohols into the corresponding secondary amines may be carried out, for example, by the known reaction with N-substituted ethylene imines or by a condensation reaction of the alcohols with primary amines in a molar ratio of between 1 : 1 and 1 : 10. If an ethylene imine derivative is used, the number n is increased to $n + 1$. Conversion of the resulting secondary amines which contain polyethylene oxide units into the biuret diisocyanates which are to be used for the process according to the invention is carried out by reacting one mol of the secondary amine with at least two mols of a diisocyanate of the above general formula $R(NCO)_2$. The secondary amine first reacts with one mol of diisocyanate to form urea isocyanate which then reacts with a second mol of diisocyanate at a higher temperature to form a biuret diisocyanate. In this reaction, trimerization of the diisocyanate may again be suppressed by means of catalytic quantities of alkylating agents such as p-toluene sulphonic acid esters. Preparation of the biuret diisocyanates used according to the invention may be carried out, for example, as described below.

A polyethylene oxide monohydric alcohol with a molecular weight of 2000 which has been started on n-butanol is used as a starting material. Reaction of this starting material with an excess of N-phenylethyleneimine (pressure vessel, 100° to 120°C, 12 to 15 hours) yields ω-N-phenylaminopolyethylene oxide with a molecular weight of about 2100 after removal of the excess N-phenylethyleneimine by distillation under vacuum (boiling point at 13 mm, 70° to 70.5°C.

2100 g of ω-N-phenylaminopolyethylene oxide and 1740 g of tolylene diisocyanate are heated to 80° to 90°C for 3 hours in the presence of 0.1% of methyl p-toluene sulphonate (urea formation). The reaction mixture is then heated at 165° to 175°C until the calculated isocyanate value of 19.7% is reached. The resulting product is a solution in tolylene diisocyanate of the biuret diisocyanate which is to be used in the process according to the invention. The ethylene oxide content is approximately 51%.

For the preparation of the self-dispersible polyurethanes according to the invention, the biuret diisocyanates are, like the allophanate diisocyanates, used in the form of mixtures with unmodified diisocyanates of the above formula $R(NCO)_2$, the said diisocyanate mixtures containing 5 mol percent to 100 mol percent, preferably 10 mol percent to 50 mol percent of the modified diisocyanates according to the invention. If desired, the process according to the invention may, of course, also be carried out with mixtures of allophanate diisocyanates and biuret diisocyanates.

The monovalent alcohols with polyethylene oxide units which are used for preparing the modified diisocyanates are obtained in known manner by ethoxylating monovalent alcohols or monovalent phenols of the general formula $R'-Y-H$ ($Y = O$) or by ethoxylating secondary amines of the general formula $R'-Y-H$ ($Y = NR''$). In these formulea, R' and R'' which may be the same or different represent hydrocarbon groups, in particular $C_1$ to $C_{10}$ alkyl groups, $C_4$ to $C_8$ cycloalkyl groups, $C_6$ to $C_{12}$ aryl groups or $C_7$ to $C_{10}$ aralkyl groups. Suitable alcohols include methanol, ethanol, n-propanol, n-hexanol, n-decanol, isopropanol, tertiary butanol, phenol, p-cresol, benzyl alcohol, and the like. Suitable secondary amines are, for example, dimethylamine, diethylamine, dipropylamine, N-methylhexylamine, N-ethyl-decylamine, N-methylaniline, N-methylbenzylamine, N-methyl-cyclohexylamine and the like.

The quantity of ethylene oxide to be grafted may vary within wide limits, the polyethylene oxide chains generally containing from about 10 to about 90 and preferably about 20 to about 70 ethylene oxide units.

To convert the polyethylene oxide alcohols into the corresponding secondary amines, N-substituted ethyleneimines of the general formula

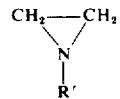

or primary amines of the general formula $R'-NH_2$ in which R' has the meaning already indicated may be used in known manner.

When carrying out the process according to the invention it is essential to use polyamides or polyester amides within a molecular weight range of 300 to 6000, preferably about 500 to about 2000, which are difunctional for the purpose of the isocyanate polyaddition reaction and contain terminal hydroxyl and/or primary or secondary amide groups. In principle, and polyester amide with a molar ratio of ester groups to amide groups not greater than 15 to 1 and preferably not greater than 10 to 1 may be used along with or instead of the polyamides. These polyamides or polyester amides are used in the process according to the invention in quantities of 5 to 100% by weight, preferably 20 to 100% by weight, based on the total quantity of organic compounds within the molecular weight range of 300 to 6000 which contain groups which are reactive with isocyanate groups. The concentration of amide groups in the polyester amides or the concentration of polyamides and/or polyester amides in the process according to the invention is chosen so that the polyurethane amides finally obtained which are dispersible or dispersed in water contain about 0.5% to about 20% by weight, preferably about 2% to about 10% by weight of amide groups (NH—CO), the polyurethane groups (o—CO—NH) obviously not counting as amide groups in the true sense of the word.

Suitable polyamides for the process according to the invention are, for example, those which can be obtained by reacting a dicarboxylic acid dialkyl ester with an excess of an difunctional primary diamine. One may also obtain suitable polyamides by reacting an excess of dicarboxylic acid dialkylesters with a difunctional primary diamine and then reacting the resulting polyamide which contains terminal ester groups, for example, with a bis-secondary diamine (terminal secondary amino groups) or with an amino alcohol or diol (terminal hydroxyl groups). Preparation of the polyamides may be carried out, for example, by stirring a mixture of bis-esters of dicarboxylic acids and the diamine at 150° to 200°C until the stoichiometric quantity of alcohol derived from the dicarboxylic acid ester has been distilled off.

The reaction of the polyamides which contain terminal ester groups with secondary diamines, amino alcohols or diols may, for example, be carried out on the same principle, i.e. preferably by heating the reactants to temperatures of 150° to 200°C, using at least 2 mols of the diamine amino alcohol or diol per mole of the polyamide which contains ester groups. The proportions in which the reactants are used for preparing the polyamide depend on the desired molecular weight and can be calculated stoichiometrically in known manner.

Suitable dicarboxylic acid diesters are, for example, the dimethyl or diethylester of dicarboxylic acids of the general formula A(COOH)$_2$ in which A represents an aliphatic hydrocarbon radical containing from 2 to 18 carbon atoms, a cycloaliphatic hydrocarbon radical containing 5 to 15 carbon atoms or an aromatic hydrocarbon radical containing 6 to 15 carbon atoms. Preferred dicarboxylic acids are aliphatic dicarboxylic acids such as oxalic acid, succinic acid, adipic acid and suberic acid and cycloaliphatic dicarboxylic acids, in particular cyclohexane dicarboxylic acids in all their stereoisomeric forms. Aromatic dicarboxylic acids such as phthalic acid, isophthalic acid, terephthalic acid, etc. may be included in amounts of up to 50 mol percent, but it is undesirable to include too high a proportion because of the resulting elevation of the softening point of the aminoamides.

Suitable bis-primary diamines are those of the general formula B(NH$_2$)$_2$ in which B has the same meaning as given to A above. The polyamides used in the process according to the invention are preferably based on aliphatic diprimary diamines and in particular cycloaliphatic diprimary diamines, for example ethylene diamine, hexamethylene diamine, octamethylene diamine, decamethylene diamine, the various isomeric cyclohexane diamines, 4,4'-diamino-dicyclohexylmethane, 1-methyl-2,4-diaminocyclohexane, 1-methyl-2,6-diaminocyclohexane, 3,3,5-trimethyl-5-aminomethylcyclohexylamine and the like.

Suitable aminoalcohols are, for example, ethanolamine, propanolamine and the like.

Suitable diols are e.g. the diols mentioned above as examples of components of the dihydroxypolyesters.

Hydrazine or hydrazine derivatives such as dicarboxylic acid bis-hydrazide may also be used in the preparation of the polyamides in amounts of up to 50 mol percent, based on the amide component.

For the process according to the invention it is preferred to use polyamides within a molecular weight range of about 500 to about 2000 which contain free amino end groups.

Oligoamides and polyamides suitable for the process according to the invention naturally also include representatives of this class of compounds which can be obtained by other methods, for example oligolactams or polylactams with molecular weights of about 500 to about 2000 which contain terminal amino groups.

Apart from polyamides, polyester amides which contain terminal hydroxyl and/or amino groups and in which the molar ratio of ester groups to amide groups is not more than 15:1 and preferably not more than 10:1 are also suitable for the process according to the invention. These polyester amides may be prepared analogously to the polyamides from the above mentioned dicarboxylic acid diesters and the above mentioned aminoalcohols or from mixtures of the above mentioned diamines and the above mentioned diols. Other suitable compounds are, for example, polylactones which have been started on the above mentioned diamine, in particular the corresponding oligo- or polycaprolactones.

The oligo- and polyester amides also preferably have a molecular weight of about 500 to about 2000.

Both the polyamides mentioned above and the polyester amides mentioned above should preferably have a softening point below 160°C. This requirement restricts the possibility of using aromatic dicarboxylic acids and of using hydrazines or hydrazine derivatives because these components result in a substantial increase in the softening point of the oligo- or polycondensates.

In the process according to the invention for preparing polyurethane amide dispersions, the use of exclusively difunctional components is an essential feature. In accordance with the findings of chemistry of high polymer latices, however, the addition of very small quantities of trifunctional low molecular weight compounds such as trifunctional isocyanates or trifunctional chain lengthening agents may in some cases cause an improvement in the properties but such trifunctional components must not be added in quantities of more than one equivalent percent, based on all the starting components which take part in the polyaddition reaction.

The hydrophilic components used in the process according to the invention may include not only the diisocyanates with side chain polyethylene oxide units and diols with side chain polyethylene oxide units already mentioned as examples but also other difunctional polyurethane building components with side chain hydrophilic polyether groups, for example the isocyanate prepolymers described in German Offenlegungsschrift No. 2,141,807, which corresponds to U.S. application Ser. No. 64564 the disclosure of which is incorporated herein by reference, which are modified with monoalkyl ethers or with monocarboxylic acid esters of polyethylene glycols. The diisocyanates and diols mentioned above which contain polyethylene oxide units are, however, more suitable on account of their strict difunctionality. Those diols mentioned above as examples which contain side chain polyethylene oxide units are particularly suitable.

Preparation of the self-dispersible polyurethane amides is carried out by the known methods of polyurethane chemistry, preferably by the two-stage process. They may also be prepared by the one-stage process but this is less advantageous.

In the process of preparation of the self-dispersible polyurethane amides, the reactants are used in such proportions that the equivalent ratio of isocyanate groups to groups which are reactive with isocyanate groups is between about 1:1 and about 2.5:1, preferably between 1.05:1 and about 1.5:1. An excess of diisocyanate leads, of course, to the formation of isocyanato terminated compounds which, on conversion into an aqueous dispersion, continue to react with water in a chain lengthening reaction to form the dispersed end product. The equivalent ratios indicated above therefore include all the components which take part in the synthesis of the polyurethane amides according to the invention, including the chain lengthening agents containing amino groups, which may be in the form of aqueous solutions, but not including the proportion of water which is required for dispersion and which subsequently reacts with any isocyanato terminated compounds present. The extent of this subsequent reaction should be kept low compared with the total chain lengthening reaction, because chain lengthening carried out exclusively with water is known to result in inferior end products.

The hydrophilic components are used in such quantities in the process according to the invention that the finished polyurethane amide contains about 3% to about 30% by weight and preferably about 5% to about 20% by weight of side chain polyethylene oxide segments.

The process according to the invention may be carried out with or without organic solvents for the reactants and/or product. Solvents which are suitable for this purpose especially if, as described below, the preparation of the polyurethane amide is intended to be followed by conversion of the polyurethane amide into an aqueous dispersion, are organic solvents with a boiling point below 100°C which are miscible with water and inert towards isocyanato groups, e.g. acetone or methyl ethyl ketone.

The two-stage process may be carried out, for example, by first preparing an isocyanate prepolymer in the melt, without solvents or already in the presence of solvents, from excess diisocyanate component (diisocyanate + optionally diisocyanate containing side chain polyethylene oxide units) and the higher molecular weight component (mixture of polyamide and/or polyester amide, optionally mixed with one of the other organic compounds having a molecular weight of 300 to 6000 given as examples above, and optionally a diol containing side chain polyethylene oxide units), the reaction being carried out with an NCO/OH ratio of between about 1.1:1 and about 3.5:1, preferably between about 1.2:1 and about 2.5:1 and then, if the reaction has been carried out without solvents, preferably taking up the isocyanate prepolymer in a suitable solvent (e.g acetone). For preparing the polyurethane amide dispersions according to the invention, it is advisable to use a special variation of the two-stage process in which the chain lengthening agent, in this case preferably one of the above-mentioned diamines, dissolved in a small quantity of water or in a mixture of water and solvent, is added to the solution of isocyanate prepolymer described above in such proportions that the NCO/NH ratio is between about 2.5 to 1 and 1.05 to 1. The reaction may be carried out at room temperatures or preferably at 25° to 60°C. The polyurethane amide dispersion is subsequently obtained by adding the remainder of the water and then removing the solvent. In this variation of the process, however, the chain lengthening agent may, if desired, be dissolved in the total quantity of water finally present in the dispersion (50 to 200% by weight, based on the solid polyurethane).

Alternatively, however, the diols with a molecular weight below 300 mentioned above may be used as chain lengthening agent but they are preferably already built into the prepolymer. In that case, the preparation of the prepolymers is carried out without the addition of polyamides or polyester amides. A polyurethane amide according to the invention is finally obtained by reacting the resulting isocyanate prepolymer which is free from amide groups with, preferably, the above mentioned diaminopolymides. In this case, a special variation of the process is to be recommended, in which the solution of diaminopolyamide in a mixture of water and solvent is added to the solution of prepolymer in such proportions that the NCO/NH ratio is between about 1.05 to 1 and about 2.5 to 1. The aminoamides are in this case preferably used in a mixture of water and a low boiling ketone or alcohol such as acetone or ethanol. The aminoamides may also be put into the reaction in the form of a concentrated solution, if necessary dilutable with water, in a high boiling solvent, in particular an alcohol such as glycol monomethylether or glycol monoethyl ether so that when the polyurethane amide obtained is subsequently converted into an aqueous dispersion, the high boiling solvent is incorporated in it in minute quantities. All the chain lengthening reactions described above may be carried out at room temperature or preferably at 25° to 60°C. The polyurethaneamide dispersion is finally obtained by adding the remainder of the water and removing the low boiling solvent.

When the one stage process is employed, the isocyanate component is preferably reacted with compounds which contain exclusively terminal hydroxyl groups. In this process, the diol component (dihydroxyoligoamide and/or dihydroxypolyester amide, optionally dihydroxy compound with a molecular weight of 300 to 6000 of the kind described above, optionally a diol with a molecular weight below 300, optionally a diol containing polyethylene oxide), is first prepared by simply mixing the components. The diisocyanate component (diisocyanate which is free from polyethylene oxide and which may be mixed with diisocyanate which contains polyethylene oxide side chains) is then added to the resulting mixture in the absence of solvent, whereupon the reaction mixture is reacted at temperatures preferably in the region of about 50° to about 150°C, optionally after the addition of known catalysts of polyurethane chemistry. The quantity of diisocyanate component used is chosen so that the NCO/OH ratio is between about 0.8 to 1 and about 1.05 to 1. The viscosity of the reaction mixture rises during the reaction, and for this reason one of the above mentioned solvents is gradually added to the mixture. An organic solution of the completely reacted polyurethane amide is finally obtained, the concentration of which is preferably adjusted to 10 to 50 and preferably 15 to 40 percent by weight of solids content.

Conversion of the dissolved polyurethane amide elastomers into an aqueous dispersion is then advantageously carried out by adding water to the stirred solution. In many cases, a water-in-oil emulsion first forms but this changes into an oil-in-water emulsion just after the viscosity passes through a maximum. After removal of the solvent by distillation, a purely aqueous stable dispersion remains behind.

In principle, the polyurethane amide elastomers according to the invention could also be converted into dispersions by other methods, for example, by a method of dispersion without solvents, e.g. by mixing the elastomer melt with water in apparatus which is capable of producing high shearing gradients, or by using very small quantities of solvents as plasticizers in the same apparatus, or by using non-mechanical dispersing agents such as sound waves of extremely high frequency. Lastly, the polyurethane ureas are also capable of undergoing chain lengthening after conversion of the prepolymer into an aqueous emulsion.

Polyurethane amides which have been dispersed in accordance with the invention have an average particle size of 0.5 m$\mu$ to 5$\mu$, preferably about 100 to 500 m$\mu$, the optical dispersion or Tyndall effect obviously making its appearance in dispersions which have particle sizes below 500 m$\mu$.

The flow properties of dispersions, which will not be described in detail here, depend on the particle size and concentration. As the particles become smaller, the viscosity rises and, below a particle size of about 100 m$\mu$, the flow limit progressively rises (Bingham body). Quite apart from these relationships, the viscosity also increases with increasing concentration, in some cases up to 50 P in this class of dispersion in which the concentration may be as high as 70%.

The dispersions are insensitive to electrolytes. This property allows, among other things, the cross-linking of latex particles with formaldehyde or formaldehyde derivatives to be catalyzed with acid catalysts. It also enables them to be pigmented with electrolytically active pigments or dyes. Another property of the dispersions according to the invention is their thermal coagulability which makes it possible for them to be made up into foils which are permeable to water vapor simply by heating them.

The dispersions may be blended with other dispersions, e.g. with polyvinyl acetate, polyethylene, polystyrene, polybutadiene, polyvinyl chloride and copolymer resin dispersions.

Fillers, plasticizers, pigments, carbon black sols and silicic acid sols, aluminium dispersions and dispersions of clay and of asbestos may also be incorporated in these dispersions.

The dispersions of polyurethane amides in water are stable, can be kept in storage and are not destroyed by frost. When applied even in very thin layers, they give rise after removal of the liquid medium to films which are glossy, very firm and generally hard and tough but have an astonishingly high elasticity. This makes them particularly suitable for use as finishes on leather dressings to make the leather easy to care for.

When suitably formulated, they may also be used as or included in primers for the same type of dressing since, when mixed with suitable pigments and applied to leather, they form a firmly adhering, soft and well covering thin layer which, when followed by an equally very thin top layer of generally unpigmented polyurethane amide dispersion which is adjusted to give a harder covering, effectively protects the leather from the influences of weathering, increases its mechanical resistance and imparts a smooth, brilliant appearance to the leather while leaving the grain of the leather practically unchanged.

The dispersions according to the invention may also be mixed with all types of cross-linking agents, especially with aldehydes or formaldehyde derivatives and catalytic quantities of strong acids since they are completely insensitive to changes in pH. After drying of the dispersions, the latex particles can be chemically cross-linked with each other so that, even if applied in very thin layers, they have high resistance to organic solvents and a high wet abrasion resistance.

The polyurethane amide dispersions according to the invention may also be used to produce thicker layers (above 100$\mu$) which completely cover the grain of the leather to give a patent leather finish.

Application of the dispersions to leather may be by spraying, knife coating or raster rolling with or without the previous addition of cross-linking agents and catalysts. The applications may also be fixed by subsequently spraying them with solutions or emulsions of cross-linking agents, preferably in water.

The examples given below serve to explain the process according to the invention and to describe some of the properties of the polyurethane amide dispersions according to the invention which are relevant to their practical application.

EXAMPLES

EXAMPLE 1

44.4 parts of 3-isocyanatomethyl-3,5,5-trimethyl cyclohexylisocyanate are added to 76 parts of a linear polyester of adipic acid and hexane-1,6-diol (hydroxyl number 130) and 22.2 parts of a compound (hereinafter known as dispersing agent A) of 1 mol of a polyethylene oxide ether (hydroxyl number 49) which was started on n-butanol, 1 mol of hexamethylene 1,6-diisocyanate and 1 mol of bis-hydroxyethylamine at 60°C and the mixture is heated to a temperature of 100°C. Heating is continued for 3 hours with stirring and exclusion of atmospheric moisture. The isocyanate content of the mixture drops to 5.9% during this time. The mixture is cooled to 60°C and diluted with 300 parts of acetone to form a first solution.

A second solution is prepared by dissolving 72 parts of a linear aminoamide of adipic acid and 3-aminomethyl-3,5,5-trimethylcyclohexylamine which contains 4.4% by weight of free amino groups in 200 parts of acetone and 100 parts of water. This solution is rapidly added to the first solution and stirred to produce a homogeneous mixture. After the initial cloudiness, the mixture becomes completely clear. 220 parts of water are added rapidly and with vigorous stirring to the resulting solution which has a solids content of 26.3%. An acetone-containing dispersion of the solid particles in water is thereby formed. This dispersion appears bluish white, but in thin layers it appears orange brown in transmitted light. After removal of the acetone by distillation at a pressure of 100 mm Hg, a purely aqueous dispersion of polyurethane amide particles which has a solids content of 40% remains behind.

The solid particles of this dispersion contains 9.3% of polyethylene oxide units and 8% of amide groups (NH—CO).

When the dispersion is poured out to form a film 100$\mu$ in thickness and the water is completely removed by evaporation, a very hard, glossy film is obtained which is very tough and flexible and has an elongation at break of about 20% and a tensile strength of 210 kg wt/cm².

EXAMPLE 2

A mixture of 31.1 parts of 3-isocyanatomethyl-3,5,5-trimethylcyclohexylisocyanate and 23.5 parts of hexamethylene 1,6-diisocyanate is added at 60°C to 71.4 parts of the linear polyester used in Example 1 and 33.6 parts of a compound which has been built up in a similar manner to the compound known as "Dispersing agent A" in Example 1, but containing a polyethylene oxide ether with hydroxyl number 57.7 (hereinafter known as "Dispersing agent B"), and the mixture is heated to a temperature of 100°C. Heating is continued for 3 hours with stirring and exclusion of atmospheric moisture. The isocyanate content drops durirng this time to 9.5%. The mixture is then cooled to 60°C and 600 parts of acetone are added.

1.25 parts of hydrazine hydrate are added after the solution has cooled to room temperature to form a first reaction solution.

252 parts of a solution in glycol monoethylether of a linear aminoamide of adipic acid and 3-aminomethyl-3,5,5-trimethylolcyclohexylamine which contain 3.1% of free amino groups, which solution has a solids content of 47.5% are mixed with 100 parts of water and rapidly added to the first reaction solution and stirred to form a homogeneous mixture.

320 parts of water are rapidly added with vigorous stirring to the resulting mixture which has a solids content of 25%. A bluish white, extremely finely divided, acetone-containing dispersion of the solid particles in water is formed. After removal of the acetone at a pressure of 100 mm Hg, a dispersion of the polyurethaneamide particles in a mixture of 75% of water and 25% of glycol monoethyl ether remains behind. The dispersion has a solids content of 35%.

The solid particles of this dispersion contain 12.0% by weight of polyethylene oxide units and 11.02% of amide groups (NH—CO).

The following Examples 3 to 13 show in tabulated form other polyurethane amide dispersions and some of their properties which are of interest for their commercial applications. These dispersions are prepared by the methods described in Examples 1 and 2.

| Example | polyester [1,3] Component | OH Number | Diisocyanate [1] Ratio II | Dispersing [5] Agent III | Chain Lengthening Agent IV [2] | Oligoamide V Dicarboxylic Acids [1] | Diamine [2] | DC/DA Molar Ratio |
|---|---|---|---|---|---|---|---|---|
| 3 | ADIP HEX | 130 | D | A | a | ADIP | G | ½ |
| 4 | ADIP BU | 50 | D/E 1:1 | A | G | | same as 3 | ⅔ |
| 5 | same as 4 | | same as 4 | A | — | ADIP/ OXAL 7:3 | G | ⅔ |
| 6 | ADIP ET | 56 | D/E 5:2 | A | — | ADIP/ TERE 1:1 | G | ½ |
| 7 | PHTH ET | 56 | D/E 4:1 | A | — | ADIP/ TERE 1:1 | G | ⅔ |
| 8 | PHTH ADIP ET | 64 | D/E 1:1 | C | — | | same as 6 | |
| 9 | PC HEX TEG | 90 | D/E 3:1 | B | H | | same as 4 | |
| 10 | ADIP BU | 117 | D/E 1:1 | B | G | | same as 4 | |
| 11 | same as 10 | | D/E 1:1 | B | G | ADIP | G | ¾ |
| 12 | same as 9 | 1/5 | D/E | B | G | | same as 4 | |
| 13 | same as 7 | | D/E 7:3 | B | I | | same as 4 | |

| Example | Preparation as in Example | Concentration | II/I+III | IV/V | NCO/NH | EOx Content Based on FK | NH—CO Content Based on FK |
|---|---|---|---|---|---|---|---|
| 3 | 1 | 40 | 2.0 | — | 1.05 | 10.2 | 4.61 |
| 4 | 1 | 40 | 3.0 | 1:1 | 1.1 | 8.9 | 4.18 |
| 5 | 1 | 40 | 3.0 | — | 1.1 | 7.8 | 7.46 |
| 6 | 1 | 40 | 2.5 | — | 1.05 | 8.2 | 4.44 |
| 7 | 1 | 40 | 2.5 | — | 1.3 | 8.8 | 5.6 |
| 8 | 1 | 40 | 2.5 | — | 1.2 | 7.5 | 3.7 |
| 9 | 1 | 30 | 4.0 | 2:1 | 1.1 | 12.8 | 5.11 |
| 10 | 1 | 40 | 3.0 | 7:3 | 1.1 | 12.3 | 3.9 |
| 11 | 2 | 40 | 3.3 | 5:2 | 1.15 | 11.5 | 4.25 |
| 12 | 1 | 40 | 3.3 | 1:4 | 1.15 | 12.0 | 2.96 |
| 13 | 1 | 50 | 2.5 | 4:1 | 1.5 | 6.2 | 1.26 |

[1]

Dicarboxylic Acids
ADIP: Adipic Acid
TERE: Terephthalic Acid
PHTH: Phthalic Acid
OXAL: Oxalic Acid
PC: Carbonic Acid (Polycarbonate)

[2]

Diamine
G = 3-isocyanato-3,5,5-tri-methyl-cyclohexylamine
H = hydrazine monohydrate
I = 4,4'-diaminodicyclo-hexylmethane

[3]

Diols
HEX = hexane-1,6-diol
BU = butane-1,4-diol
ET = ethylene glycol
TEG = tetraethylene glycol

[4] Diisocyanate

[5] Dispersing Agents

| Example | I polyester Component | OH Number | Diisocyanate Ratio II | -continued Dispersing Agent III | Chain Lengthening Agent IV | Oligoamide V Dicarboxylic Acids | Diamine | DC/DA Molar Ratio |
|---|---|---|---|---|---|---|---|---|
| D = | 3-isocyanatomethyl-3,5,5-trimethyl-cyclohexylisocyanate | | | A = | | Dispersing Agent A (see Example 1) | | |
| E = | hexamethylene-1,6-diisocyanate | | | B = | | Dispersing Agent B (see Example 2) | | |
| | | | | C = | | the same as dispersing agent A OH number of polyethylene oxide ether: 29 | | |

EXAMPLE 14

225 parts of the polyester used in Example 7 and 28 parts of dispersing agent B (see Example 2) are mixed with 54.4 parts of tolylene-2,4-diisocyanate and 100 parts of anhydrous acetone at 50°C and the mixture is stirred at this temperature for 90 minutes. The isocyanate content drops to 3.3% during this time. 500 parts of acetone and 100 parts of water are added to form a prepolymer solution.

Immediately thereafter, a mixture of 4.1 parts of 3-amino-3,5,5-trimethyl-cyclohexylamine and 145 parts of the solution described in Example 2 of a diaminoamide in glycol monoethylether is stirred into the prepolymer solution at 15°C. The resulting solution has a solids content of 38%. 375 parts of water are then rapidly added with vigorous stirring, a bluish, very finely divided, acetone-containing dispersion of the solid particles in water being formed. After removal of the acetone at a pressure of 100 mm Hg, a dispersion of the polyurethane amide solid particles in a mixture of 85% of water and 15% of glycol monoethyl ether, which has a solids content of 40%, remains behind.

The solid particles of this dispersion contain 7.8% of polyethylene oxide units and 4.7% of amide (NH—CO) groups.

EXAMPLE 15

180 parts of a linear polypropylene glycol polyether with hydroxyl number 112 are reacted with 45 parts of dispersing agent B (see Example 2) and 105 parts of tolylene diisocyanate in 200 parts of acetone as described in Example 14. After termination of the reaction, the reaction mixture is mixed with 600 parts of acetone, and 200 parts of water are added.

A mixture of 7 parts of hydrazine monohydrate and 335 parts of the aminoamide solution used in Example 14 is then immediately added to this solution.

A dispersion is then prepared and worked up as described in Example 14, using 550 parts of water.

A 35% dispersion in a mixture of 80% water and 20% glycol monoethyl ether is obtained.

The solid particles of the dispersion contain 7.9% of polyethylene oxide units and 8.3% of NH-CO groups.

EXAMPLE 16

206 g of a polyester from adipic acid and ethylene glycol having a molecular weight of 2060 are heated for 30 minutes to 110°C to remove any water dissolved therein. Subsequently 74 g of an allophanate diisocyanate mixture are added at 70°C. The diisocyanate mixture had previously been obtained by reacting ethoxylated n-butanol (molecular weight 2030) with toluylene diisocyanate at a molar ratio of 1:5 and has an NCO-content of 16,9 % by weight. Subsequent to the addition of the diisocyanate mixture the reaction system is heated for 1 hour to 110°C until the theoretical NCO-value of 1,5 % by weight is reached. The prepolymer obtained is dissolved in 800 ml of acetone. A solution of 1,15 g of 1,2-propylene diamine in 30 ml of water is added at 50°C. Thereafter a solution consisting of 16 g of an oligo amide obtained from 1-aminomethyl-5-amino-1,3,3-trimethylhexane and adipic acid in a molar ratio of 4:3, 16 g of ethyl acetate and 100 ml of acetone is added. The reaction mixture is allowed to react for 5 minutes at 50°C. Thereafter 400 ml of water are added and the acetone is distilled off under vacuo. An aqueous dispersion is obtained the solids of which contain 14,8 % by weight of ethylene oxide units. A film which is obtainable by pouring the dispersion on a glass plate and evaporating the water is smooth and elastic.

EXAMPLE 17

197 g of water free hexane-diol-1,6-polycarbonate having a molecular weight of 1970 are heated to 70°C. A mixture of 40,2 g of an allophanate diisocyanate obtained by reacting toluylen diisocyanate with ethoxylated n-butanol (molecular weight 2030) at an molecular ratio of 1:10 and 11,8 g of hexamethylene diisocyanate are added. The mixture is heated to 110°C until the theoretical NCO-value of 2,36 % by weight is reached. The prepolymer thus obtained is dissolved in 800 ml of acetone. 1,8 g of 1,2-ethylene diamine dissolved in 50 ml of water are added at 50°C. Immediately thereafter a solution 25 g of the oligo amide of Example 16 in 50 g of ethyl acetate and 100 ml of acetone is added. The reaction mixture is allowed to react for 5 minutes at 50°C. Thereafter 850 ml of water are added and the acetone is distilled off in vacuo. A dispersion is obtained the solids of which contain 8,5 % by weight of ethylene oxide units. Films prepared from this dispersion are transparent, elastic and tack-free.

Any of the other organic diisocyanates, organic compounds having reactive hydrogen atoms and a molecular weight of 300 to 6000, and any other chain extender indicated as suitable herein may be substituted for those used in the foregoing examples.

Although the invention has been described in detail above for the purpose of illustration, it is to be understood that such detail is solely for that purpose and that variations can be made therein by those skilled in the art without departing from the spirit and scope of the invention except as it may be limited by the claims.

What is claimed is:

1. In a process for preparing a polymer which is dispersible in water without an emulsifier which comprises reacting an organic diisocyanate with organic compounds in the molecular weight range of 300 to 6000 which are difunctional for the purpose of the isocyanate polyaddition reaction, contain hydrogen atoms which are reactive with isocyanate groups and do not contain any side chain polyethylene oxide units wherein (1) an organic compound which is difunctional for the purpose of the isocyanate polyaddition reaction, contains hydrogen atoms which are reactive with isocyanate groups, and contains side chain polyethylene oxide units, or (2) an organic diisocyanate or mixture of diisocyanates containing from about 5 mol percent to about 100 mol percent of diisocyanate which contains side chain polyethylene oxide units is included in the reaction mixture, the improvement wherein the said organic compounds having a molecular weight of 300 to 6000 contains from about 5% to 100% by weight of polyamide or polyester amide, the ratio of ester groups to amide groups in the polyester amide being not more than 15:1 and the ratio of the reactants being in such proportions that the resulting product contains about 0.5% to about 20% by weight of amide groups.

2. The process of claim 1 wherein the organic diisocyanate which contains polyethylene oxide units has the general formula

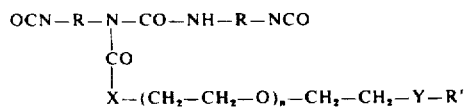

in which R represents an organic radical obtained by removing the isocyanate groups from an organic diisocyanate within a a molecular weight range of about 112 to about 1000, R' represents a monovalent hydrocarbon radical containing 2 to 10 carbon atoms, X and Y are identical or different and represent oxygen or a group of the formula N(R'') in which R'' represents a monovalent hydrocarbon group containing 1 to 12 carbon atoms, and n represents an integer of from 9 to 89.

3. The process of claim 1 wherein the organic compound which is difunctional for the purpose of the isocyanate polyaddition reaction contains hydrogen atoms which are reactive with isocyanate groups and contains side chain polyethylene oxide units has the general formula

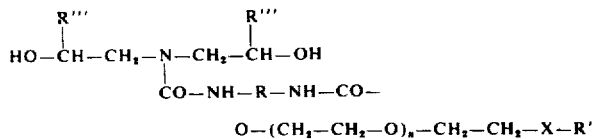

in which
R represents a divalent radical obtained by removing the isocyanate groups from a diisocyanate with a molecular weight of about 112 to about 1000, X represents oxygen or NR'', R' and R'' are identical or different and represent monovalent hydrocarbon groups containing 1 to 12 carbon atoms, R''' represents hydrogen or a monovalent hydrocarbon radical containing 1–8 carbon atoms, n represents an integer from 4 to 89.

4. A polyurethane dispersion prepared by dispersing the product of the process of claim 1 in water.

5. The process of making an aqueous dispersion which comprises mixing an organic solvent solution of the product of the process of claim 1 with water while subjecting the resulting mixture to a shearing action and removing the organic solvent therefrom.

6. The process of making an aqueous dispersion which comprises mixing the product of the process of claim 1 with water and dispersing said product as particles having an average particle size of 0.5 millimicrons to 5 microns in the water.

7. The product of the process of claim 1.

8. In the preparation of a water dispersible reaction product of an organic diisocyanate and organic compounds having reactive hydrogen atoms determinable by the Zerewitinoff method wherein one of the said reactants includes a compound having a side chain containing polyethylene oxide units, the improvement wherein from about 5% to about 100% by weight of the organic compound having reactive hydrogen atoms is a polyamide or polyester amide having a molecular weight of 300 to 6000, the ratio of ester groups to amide groups in the polyester amide being not more than 15:1, and the proportions of the reactants being such that the resulting reaction product contains about 0.5% to about 20% by weight of amide groups.

9. In a process for preparing a polymer which is dispersible in water without an emulsifier which comprises reacting an organic diisocyanate with organic compounds in the molecular weight range of 300 to 6000 which are difunctional for the purpose of the isocyanate polyaddition reaction, wherein one of the reactants includes a compound having a side chain containing polyethylene oxide units, the improvement wherein from about 5% to about 100% by weight of the organic compound having reactive hydrogen atoms is a polyamide or polyester amide having a molecular weight of 300 to 6000, the ratio of ester groups to amide groups in the polyester amide being not more than 15:1, and the proportions of the reactants being such that the resulting reaction product contains about 0.5% to about 20% by weight of amide groups.

10. The process of claim 9 wherein the reactant containing side chain polyethylene oxide units has the general formula

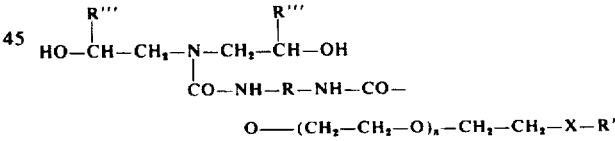

in which
R represents a divalent radical obtained by removing the isocyante groups from a diisocyanate with a molecular weight of about 112 to about 1000, X represents oxygen or NR'', R and R'' are identical or different and represent monovalent hydrocarbon groups containing 1 to 12 carbon atoms, R''' represents hydrogen or a monovalent hydrocarbon radical containing 1–8 carbon atoms, n represents an integer from 4 to 89.

11. A polyurethane dispersion prepared by dispersing the product of the process of claim 9 in water.

12. The process of claim 9 wherein the said organic compound having a molecular weight of 300 to 6000 is a polyamide.

13. The process of claim 9 wherein a polyamide having amino groups and a molecular weight of about 500 to about 2000 is used to provide about 5% to about 100% by weight of the said organic compound having a molecular weight of 300 to 6000.

14. The process of making an aqueous dispersion which comprises mixing an organic solvent solution of the product of the process of claim 9 with water while subjecting the resulting mixture to a shearing action and removing the organic solvent therefrom.

15. The process of making an aqueous dispersion which comprises mixing the product of the process of claim 9 with water and dispersing said product as particles having an average particle size of 0.5 millimicrons to 5 microns in the water.

* * * * *